(12) United States Patent
Daute et al.

(10) Patent No.: US 8,741,404 B2
(45) Date of Patent: Jun. 3, 2014

(54) PACKAGING FOR LIPOPHILIC MATERIALS

(76) Inventors: Peter Daute, Beverstedt (DE); Martin Schäfer, Stubben (DE)

( * ) Notice: Subject to any disclaimer, the term of this patent is extended or adjusted under 35 U.S.C. 154(b) by 0 days.

(21) Appl. No.: 13/577,144

(22) PCT Filed: Feb. 3, 2011

(86) PCT No.: PCT/EP2011/000481
§ 371 (c)(1),
(2), (4) Date: Nov. 19, 2012

(87) PCT Pub. No.: WO2011/095333
PCT Pub. Date: Aug. 11, 2011

(65) Prior Publication Data
US 2013/0064932 A1 Mar. 14, 2013

(30) Foreign Application Priority Data

Feb. 3, 2010 (DE) .................. 10 2010 006 833
Oct. 11, 2010 (DE) .................. 10 2010 047 881

(51) Int. Cl.
*B29D 22/00* (2006.01)
*C11C 3/10* (2006.01)
*B32B 15/08* (2006.01)
*B32B 27/08* (2006.01)

(52) U.S. Cl.
CPC . *C11C 3/10* (2013.01); *B32B 15/08* (2013.01); *B32B 27/08* (2013.01)
USPC ..................... 428/35.7; 428/36.91

(58) Field of Classification Search
CPC ........ B32B 15/08; B32B 27/08; B32B 27/10; B32B 27/32; B32B 27/34; B32B 27/36; B32B 29/00; B65B 29/00; B05D 3/007; B65D 25/00; C11C 3/10; C08L 27/06; C08L 67/02; C08L 67/00
USPC ............................ 428/35.7, 36.91
See application file for complete search history.

(56) References Cited

U.S. PATENT DOCUMENTS

| | | | |
|---|---|---|---|
| 2,686,168 A | 10/1954 | Reid et al. | |
| 4,381,407 A * | 4/1983 | Bremus et al. | 560/263 |
| 5,430,098 A | 7/1995 | Samuel et al. | |
| 5,576,367 A | 11/1996 | O'Brien et al. | |
| 7,071,343 B2 * | 7/2006 | Daute et al. | 549/514 |
| 2004/0106812 A1 * | 6/2004 | Daute et al. | 549/562 |
| 2004/0198909 A1 | 10/2004 | Breitscheidel et al. | |
| 2008/0058466 A1 | 3/2008 | Joshi et al. | |
| 2009/0324917 A1 | 12/2009 | Wang et al. | |
| 2010/0176136 A1 * | 7/2010 | Lacoste et al. | 220/660 |
| 2011/0124785 A1 * | 5/2011 | Daute et al. | 524/315 |
| 2013/0055683 A1 * | 3/2013 | Daute et al. | 53/467 |
| 2013/0064932 A1 * | 3/2013 | Daute et al. | 426/106 |

FOREIGN PATENT DOCUMENTS

| | | |
|---|---|---|
| EP | 1672014 A1 | 6/2006 |
| JP | 07-188390 A | 7/1995 |
| JP | 2002060728 A | 2/2002 |
| WO | WO0139968 A1 | 6/2001 |

OTHER PUBLICATIONS

International Search Authority, International Search Report in corresponding application No. PCT/EP2011/000481, dated Nov. 16, 2011, 5 pages.
International Preliminary Report on Patentability and written opinion in corresponding application No. PCT/EP2011/000481, dated Aug. 7, 2012, 7 pages.
International Search Authority, International Search Report in corresponding application No. PCT/EP2011/000480, dated Nov. 16, 2011, 5 pages.
International Preliminary Report of Patentability and Written Opinion in corresponding application No. PCT/EP2011/00000480, dated Aug. 7, 2012, 7 pages.

* cited by examiner

*Primary Examiner* — N. Edwards
(74) *Attorney, Agent, or Firm* — Wood, Herron & Evans, LLP

(57) ABSTRACT

The present invention relates to a packaging comprising a container surrounding a container interior, wherein at least the inner surface of the container in contact with the container interior is produced from a composition which comprises a thermoplastic polymer, and a plasticizer composition comprising—a polymeric plasticizer and a polyol ester, and wherein the container is at least partly filled with a lipophilic packed product.

13 Claims, No Drawings

PACKAGING FOR LIPOPHILIC MATERIALS

This Application is a U.S. National Phase of PCT/EP2011/000481 entitled "Packaging For Lipophilic Materials" filed Feb. 3, 2011, which claims the benefit of DE Application Serial Number 10 2010 006 833.0 filed Feb. 3, 2010, and DE Application Serial Number 10 2010 047 881.4 filed Oct. 11, 2010, the disclosures of which are hereby incorporated by reference herein.

The present invention relates to a packaging comprising a container surrounding a container interior.

Plasticizers are substances which are admixed to brittle and hard plastics, such as, for example, polyvinyl chloride (PVC), to impart to these properties which are desirable for processing and use, such as flexibility and extensibility. The industrially relevant plasticizers and their use are known and are described, for example, in David F. Cadogan, Christopher J. Howick: "*Plasticizers*", Ullmann's Encyclopedia of Industrial Chemistry, electronic release, 6th ed., chap. 1-6, Wiley-VCH, Weinheim 2003 and L. Meier: "*Weichmacher*", in R. Gächter, H. Müller (ed.): Taschenbuch der Kunststoffadditive, 3rd edition, p. 341 et seq., Hanser, Munich 1990.

In the field of PVC packagings or when PVC articles come into contact with oil or gasoline, the oil or the gasoline may dissolve plasticizers out of the PVC article. In this connection, for example, the inner layers of laminate-based packaging containers or packaging containers produced entirely from PVC present particular problems. Due to the high internal surface area of such packaging containers, migration of plasticizer into the packed product can rapidly occur. In order to prevent or minimize this migration of plasticizer into the packed product, polymeric plasticizers are employed. These polymeric plasticizers are usually high molecular weight polyesters of diols and dicarboxylic acids which are characterized by a relatively low tendency towards migration. The disadvantage of polymeric plasticizers, however, is that they are characterized by a comparatively high viscosity and are therefore only poorly processable. An addition of non-polymeric, low-viscosity plasticizers would indeed reduce the viscosity of the polymeric plasticizers to a certain extent and thus improve their processability, but this would be at the expense of an increased migration of the plasticizer into the packed product. This migration of plasticizers into the packed product may be particularly pronounced especially if the packed product is, for example, a foodstuff which is heated in an autoclave at a temperature of as a rule about 120° C., for the purpose of sterilization, while it is in the packaging.

The present invention was based on the object of overcoming the disadvantages resulting from the prior art in connection with packagings for lipophilic materials, in particular in connection with packagings which comprise PVC as the material of the inner layer (that is to say that layer which comes into direct contact with the packed product) and which contain lipophilic materials, such as, for example, oils or gasoline, as the packed product.

One object according to the invention was chiefly based on providing a process with the aid of which a lipophilic packed product can be stored for a long time and without the risk of contamination with plasticizers, often also at higher temperatures.

In particular, the present invention was based on the object of providing a packaging comprising a container surrounding a container interior, the inner surface of which in contact with the container interior is produced from a thermoplastic polymer, preferably from PVC, the plasticizers contained in this innermost layer being characterized by particularly advantageous migration properties with respect to a hydrophobic packed product.

Generally, a contribution towards achieving at least one of the above objects is made by the classifying claims. The sub-claims dependent upon these are in each case preferred embodiments of the present invention.

A contribution towards achieving the objects described above is made by a packaging comprising a container surrounding a container interior, wherein at least the inner surface of the container in contact with the container interior is produced from a composition which comprises
    a thermoplastic polymer, and
    a plasticizer composition comprising
        a polymeric plasticizer and
        a polyol ester,
and wherein the container is at least partly filled with a lipophilic packed product.

All the container forms known to the person skilled in the art are possible as the container. Thus, the container can be, for example, a can, a bottle, a canister, a drum, for example a plugged drum, or the like. Non-rigid receptacles, but in particular also a blown film at least partly surrounding a packed product, are furthermore possible as "containers" in the context of the present invention.

This container is filled at least partly, preferably to the extent of at least 50 vol. %, particularly preferably to the extent of at least 75 vol. % and most preferably to the extent of at least 90 vol. % (in each case based on the maximum volume with which the container can be filled) with a lipophilic packed product. The lipophilic packed product is preferably a lipophilic substance which is liquid at 20° C. Possible liquid lipophilic substances here are all liquids which lead to a two-phase system in a mixture with water. Lipophilic substances which are particularly preferred according to the invention are oils, in particular edible oils of vegetable or animal origin, hydrocarbons or hydrocarbon mixtures, such as, for example, gasoline. Possible lipophilic packed products are furthermore fat-containing foodstuffs, in particular foodstuffs with a fat content of at least 10 wt. %, particularly preferably at least 25 wt. % and most preferably at least 50 wt. %, in each case based on the total weight of the foodstuff. Examples of such foodstuffs which may be mentioned are, for example, cheese, meat or sausage.

The composition from which at least the inner surface of the container jacket in contact with the container interior is produced comprises as one component a thermoplastic polymer.

Thermoplastic polymers which are preferred in particular are polymers chosen from the group consisting of polyvinyl chloride (PVC), polypropylene (PP), polyethylene (PE), polyethylene terephthalate (PET), polylactate (PLA), polycarbonate, polystyrene, polyurethanes, polyethers, rubber, preferably natural rubber in the form of polyisoprene crosslinked by sulphur, or synthetic rubber based on acrylonitrile and 1,3-butadiene (NBR rubber), styrene and 1,3-butadiene, acrylic acid, styrene and acrylic acid or vinyl acetate, polybutadiene, copolymers of at least two of the above polymers, in particular polyethylene/polypropylene copolymers, and mixtures of at least two of these. PE, PP, PVC, PET, rubber and PLA are particularly preferred as thermoplastic polymers, PVC and rubber being most preferred.

PVC is obtained by homopolymerization of vinyl chloride. The PVC contained in the composition according to the invention can be prepared, for example, by suspension polymerization, microsuspension polymerization, emulsion polymerization or bulk polymerization. The preparation of PVC by polymerization of vinyl chloride and the preparation and composition of plasticized PVC are described, for example, in Becker/Braun, Kunststoff-Handbuch, volume 2/1: "*Polyvinylchlorid*", 2nd edition, Carl Hanser Verlag, Munich. Depending on the content of plasticizers, in the case of mixtures containing a plasticizer and PVC a distinction is made between rigid PVC (<0.1% of plasticizer) and plasticized PVC (>0.1% of plasticizer).

The composition from which at least the inner surface of the container jacket in contact with the container interior is produced comprises as one component a plasticizer composition which comprises as one component a polymeric plasticizer and as a further component a polyol ester.

The polymeric plasticizer is preferably a polyester of a dicarboxylic acid and at least one diol, the dicarboxylic acid preferably being a $C_2$-$C_{20}$-dicarboxylic acid and the diol preferably being a $C_2$-$C_{20}$-diol. In this context, the end groups of the polyester can contain an ester with a mono-functional organic compound. This closing of the end groups can be via a monoalcohol in the case of an excess of acid and via a monocarboxylic acid in the case of an excess of alcohol, as is described, for example, in GB 1 173 323 or U.S. Pat. No. 5,281,647.

In this connection, preferred dicarboxylic acids are, in particular, dicarboxylic acids chosen from the group consisting of oxalic acid, malonic acid, succinic acid, glutaric acid, adipic acid, pimelic acid, suberic acid, azelaic acid, sebacic acid, dodecandioic acid, 1,3-cyclohexanedicarboxylic acid, brassylic acid, hexahydrophthalic acid, terephthalic acid, phthalic acid and a mixture of at least two of these dicarboxylic acids, while preferred diols are, in particular, diols chosen from the group consisting of 1,2-ethanediol, 1,2-propanediol, 1,3-propanediol, 1,2-butanediol, 1,3-butanediol, 1,4-butanediol, 1,2-pentanediol, 1,3-pentanediol, 2-methyl-1,3-pentanediol, 1,4-pentanediol, 1,5-pentanediol, neopentyl glycol, 1,2-hexanediol, 1,3-hexanediol, 1,4-hexanediol, 1,5-hexanediol, 1,6-hexanediol, diethylene glycol, triethylene glycol, dipropylene glycol, tripropylene glycol, polyethylene glycols with a molecular weight in a range of from 200 to 1,000, polypropylene glycols with a molecular weight in a range of from 200 to 1,000, hydroxypivalic acid mononeopentyl glycol ester and a mixture of at least two of these diols.

The polyester plasticizers described above can be prepared industrially in a manner known per se by esterification of the dicarboxylic acid with the diol, optionally in the presence of suitable closing groups. In a preferred embodiment, for example, adipic acid and at least one diol from the group of 1,2-propanediol, 1,3-butanediol and 1,4-butanediol and optionally further diols or monocarboxylic acids, as closing groups, and esterification catalysts, for example dialkyl titanates, methanesulphonic acid or sulphuric acid, are initially introduced into a reaction tank and the mixture is first heated to temperatures of from, for example, 100 to 140° C. and homogenized by means of stirring. The reaction mixture is then heated to temperatures of from, for example, 160 to 190° C. under normal pressure. The esterification with splitting off of water starts at approx. 150° C. The water of reaction formed is separated off by distillation over a column. The reaction mixture is then heated further to temperatures of from, for example, 200 to 250° C., a vacuum of from, for example, 150 to 300 mbar is applied and further water of reaction is removed from the reaction mixture by means of passing through nitrogen. The reaction mixture is stirred in vacuo and while passing through nitrogen at temperatures of from, for example, 200 to 250° C., until the acid number of the reaction mixture has reached a value of <15 mg of KOH/g. For esterification of the free hydroxyl groups, the reaction mixture can then optionally preferably be pumped into a second tank and stirred at temperatures of from, for example, 200 to 250° C. under a vacuum of from, for example, 10 to 150 mbar and with removal of residual water by means of passing through an increased stream of nitrogen, until the acid number of the reaction mixture has reached a value of <1.0 mg of KOH/g. Thereafter, the reaction product is preferably also filtered at temperatures of from, for example, 80 to 140° C. Such a process is described in detail, for example, in WO-A-2003/018686.

According to the invention, it is furthermore preferable for the polyester plasticizer described above to have a viscosity, determined by the Brookfield method at 20° C., of at least 500 mPas, particularly preferably of at least 750 mPas and most preferably of at least 1,000 mPas, where the viscosity of the polyester is conventionally in a range of from 500 to 20,000 mPas, preferably in a range of from 750 to 15,000 mPas and most preferably in a range of from 1,000 to 5,000 mPas.

The polyol ester contained in the plasticizer composition is preferably an ester of a $C_1$-$C_{10}$-monocarboxylic acid and a diol, triol or tetraol.

In this connection, it is preferable for the $C_1$-$C_{10}$-monocarboxylic acid to be a monocarboxylic acid chosen from the group consisting of formic acid, acetic acid, propionic acid, butyric acid, hexanoic acid, pelargonic acid, 2-ethylhexanoic acid, nonanoic acid and a mixture of at least two of these monocarboxylic acids, and the diol, triol or tetraol to be a diol, triol or tetraol chosen from the group consisting of ethylene glycol, propylene glycol, diethylene glycol, dipropylene glycol, triethylene glycol, tripropylene glycol, glycerol, trimethylolpropane, diglycerol and a mixture of at least two of these triols or tetraols. Very particularly preferred polyol esters are triacetates and tripropionates of triols or tetraols, glycerol triacetate (triacetin), glycerol tripropionate or a mixture of glycerol triacetate and glycerol tripropionate being most preferred as the polyol ester.

The polyol esters are prepared from the monocarboxylic acids and the triols or tetraols by a simple esterification in the presence of suitable catalysts, such as is described, for example, for triacetin in DE-A-30 04 660. According to DE-A-30 04 660, triacetin can be obtained continuously by reaction of glycerol and acetic acid and post-acetylation with acetic anhydride. In this context, glycerol and acetic acid are reacted with one another in counter-current in the ratio of 2.5:1 to 5:1, for example liquid glycerol being passed in counter-current against an ascending stream of superheated acetic acid vapour in an esterification column designed with a plurality of double bubble trays under a pressure of from 0.2 to 30 bar and at a temperature of from 180 to 250° C. The dwell time of the reaction mixture is conventionally at least 1 hour. When an OH number of <600 is reached, acetic anhydride is added to the mixture flowing down, at the bottom of the column or in a corresponding after-reactor, in an amount such that water dissolved in the liquid reaction phase and mono- and diacetin present can react quantitatively to give acetic acid. Preferably, 0.1 to 1.5 mol of acetic anhydride per mol of glycerol to be reacted are employed here. If catalysts are present, preferably 0.01 to 0.5 per cent by weight of p-toluenesulphonic acid, the pressure can be reduced to 0.2 to 3 bar and the reaction temperature can be reduced to 100 to 180° C.

It is furthermore preferable according to the invention for the plasticizer composition to have a viscosity, determined by the Brookfield method at 20° C., of less than 8,000 mPas, particularly preferably of less than 6,000 mPas and most preferably of less than 4,000 mPas.

In addition to the thermoplastic polymer and the plasticizer composition, the composition can comprise at least one additive which differs from these two components. Possible additives here are, in particular, stabilizers, lubricants, fillers, pigments, flame inhibitors, light stabilizers, blowing agents, polymeric processing auxiliary substances, impact improvers, optical brighteners, antistatics or biostabilizers. Additives which can be employed in this context are, in particular, those components which are described in WO-A-2003/018686 as suitable stabilizers, lubricants, fillers, pigments, flame inhibitors, light stabilizers, blowing agents, in particular blowing agents based on carbonates such as, for example, calcium carbonate, polymeric processing auxiliary substances, impact improvers, optical brighteners, antistatics or biostabilizers. The amounts in which these additives are preferably employed are also to be found in WO-A-2003/018686.

According to a preferred embodiment of the packaging according to the invention, the composition from which at least the inner surface of the container jacket in contact with the container interior is produced comprises I) 40 to 90 wt. %, particularly preferably 45 to 80 wt. % and most preferably 50 to 70 wt. %, in each case based on the total weight of the composition, of a thermoplastic polymer, II) 10 to 60 wt. %, particularly preferably 20 to 50 wt. % and most preferably 30 to 40 wt. %, in each case based on the total weight of the composition, of the plasticizer composition, and III) 0 to 25 wt. %, particularly preferably 1 to 10 wt. % and most preferably 2 to 5 wt. %, in each case based on the total weight of the composition, of at least one additive which differs from components I) and II), wherein the amount of components I), II) and III) adds up to 100 wt. %.

According to a first particular embodiment of the packaging according to the invention, the container is a multilayered laminate, the innermost layer of which facing the container interior is produced from the composition described above. In this context, it is preferable for the innermost layer to have a layer thickness in a range of from 10 to 500 μm, particularly preferably from 20 to 250 μm and most preferably from 50 to 100 μm.

All laminates which are conventionally employed for the production of packagings, in particular packagings for fat- or oil-containing foodstuffs, are possible here as the packaging laminate. As a rule, such laminates comprise a stiffening base layer (often paper, paperboard or cardboard), on to the two surfaces of which thermoplastic polymer layers, for example polyethylene layers, polypropylene layers, polyester layers or polyamide layers are applied. Barrier layers which can suppress penetration of gas, for example an aluminium foil, can also be provided as a further intermediate layer. In such a laminate-like embodiment of the container jacket, the innermost layer of such a laminate (which is that layer which in the end comes into direct contact with the foodstuff) is produced from the composition described above.

In such a case, the packaging according to the invention is obtainable, for example, by a process comprising the process steps a) provision of a laminate precursor;
b) application of a composition to at least one of the two surfaces of the laminate precursor, the composition being obtainable by mixing the thermoplastic polymer in particulate form and the plasticizer composition and optionally at least one of the further additives described above;
c) heating of the composition applied to at least one of the two surfaces of the laminate precursor to a temperature which is sufficient to gel the composition;
d) cooling of the gelled composition;
e) formation of a container from the laminate obtained in this way, the layer applied in process step b) facing the container interior;
f) filling of the container with the lipophilic packed substance;
g) closing of the filled packaging.

In process step a), a laminate precursor is first provided. This laminate precursor can be, for example, a conventional packaging laminate on to which the innermost layer has not yet been applied.

In process step b), a composition is then applied to at least one of the two surfaces of the laminate precursor, the composition being obtainable by mixing the thermoplastic polymer in particulate form and the plasticizer composition and optionally the at least one further additive. The composition applied in process step b) is preferably a paste-like composition with a Brookfield viscosity, determined at 40° C., in a range of from 1,000 to 10,000 mPas, particularly preferably in a range of from 2,000 to 8,000 mPas and most preferably in a range of from 3,000 to 6,000 mPas.

The preparation of such polymer pastes, preferably such PVC pastes, can be carried out by the method and manner known to the person skilled in the art. For this, finely divided particles of the thermoplastic polymer, preferably particles with a particle size in a range of from 0.1 to 100 μm, particularly preferably in a range of from 1 to 30 μm, optionally together with the further additives, for example together with fillers, are conventionally dispersed in the plasticizer composition. Processes for the preparation of plasticized thermoplastic polymers, in particular plasticized polyvinyl chloride, are known, for example, from L. Meier: "Weichmacher", in R. Gächter, H. Müller (ed.): Taschenbuch der Kunststoffadditive, 3rd edition, p. 350-p. 357, Hanser Verlag, Munich 1990. Further details of the preparation in particular of PVC pastes can also be found in chapter 7.3 "Herstellung von PVC-Pasten" in "Kunststoffhandbuch Polyvinylchlorid 2/2", editor Hans K. Felger, 1986, Karl Hanser Verlag Munich/Vienna.

The application of the polymer pastes to at least one of the two surfaces of the laminate precursor can be carried out by all processes which seem suitable to the person skilled in the art for applying a polymer paste to a laminate web. The polymer paste is particularly preferably applied to the laminate web by brushing or by means of rolling.

In process step c) of the process according to the invention, the composition applied to at least one of the two surfaces of the laminate precursor is heated to a temperature which is sufficient to gel the composition. During gelling, the particles of the thermoplastic polymer, preferably the PVC particles, dissolve at least partly in the plasticizer composition, so that a homogeneous, solid, more or less elastic plasticated material is obtained. In the case of PVC as the thermoplastic polymer, the temperature at which the polymer paste is heated in process step c) is conventionally in a range of from 160 to 220° C.

In process step d) of the process according to the invention, the gelled composition is then allowed to cool.

After the cooling, in process step e) a container is formed from the laminate obtained in this way, the layer applied in process step b) facing the container interior; The formation of a container can be carried out, for example, by first stamping out of the laminate packaging blanks such as are described, for example, in DE 24 12 447 OS, which are then converted into a container by folding and sealing, the sealing conventionally being carried out via the preferably thermoplastic outer layers of the laminate.

In process step f), this container is then filled with the lipophilic packed substance, and in process step g) the packaging filled in this manner is closed, the closing of the packaging preferably likewise being carried out via sealing of the preferably thermoplastic outer layers of the laminate.

According to a second particular embodiment of the packaging according to the invention, the container is not formed from a multilayered laminate, but is essentially made from the thermoplastic composition described above. It is particularly preferable in this connection for the container to be produced from the composition described above to the extent of at least 50 wt. %, particularly preferably to the extent of at least 75 wt. %, still more preferably to the extent of at least 95 wt. % and most preferably to the extent of 100 wt. %, in each case based on the total weight of the container.

Such a packaging is obtainable, for example, by a process comprising the process steps:
A) introduction of a composition which is obtainable by mixing the thermoplastic polymer in particulate form and the plasticizer composition and optionally at least one of the further additives described above into an injection mould which forms the container;
B) heating of the composition in the injection mould to a temperature which is sufficient to gel the composition;
C) cooling of the gelled composition;
D) removal of the container from the injection mould;
E) filling of the container with the lipophilic packed substance;
F) closing of the filled container.

In process step A), a composition which is obtainable by mixing the thermoplastic polymer in particulate form and the plasticizer composition and optionally at least one of the further additives described above is introduced into an injection mould which forms the container, it also being preferable here for the PVC pastes described above to be employed as the composition. The production of shaped articles from PVC pastes by means of injection moulding processes is known to the person skilled in the art, for example, from EP-A-442 099. Heating in process step B) of the composition introduced in this way for the purpose of gelling is preferably carried out under the conditions described above. After the container has been removed from the injection mould, it is filled with the lipophilic packed product and then closed in process step F), it being possible for closure systems known to the person skilled in the art, for example screw closures, crown corks and the like, to be employed here. Cooling in process step C) of the injection moulds obtained after the gelling can of course be carried out before, during or after process step D).

A packaging, in particular a packaging based on a blown film, according to the second particular embodiment of the packaging according to the invention described above, is furthermore obtainable by a process comprising the process steps:
i) introduction of a composition which is obtainable by mixing the thermoplastic polymer in particulate form and the plasticizer composition and optionally at least one of the further additives described above into a blown film installation;
ii) heating of the composition in the blown film installation to a temperature which is sufficient to gel the composition;
iii) extrusion of the gelled composition through an annular die and inflation of the tube formed from the gelled composition by means of air;
iv) cooling of the tube to obtain a blown film;
v) packaging of the lipophilic packed product with the blown film.

In process step i) of this process, a composition which is obtainable by mixing the thermoplastic polymer in particulate form and the plasticizer composition and optionally at least one of the further additives described above is first introduced into a blown film installation, and in process step ii) is heated there to a temperature which is sufficient to gel the composition.

The most important constituent of such a blown film installation is the extruder. This extruder essentially comprises a heatable metal barrel in which the plasticating screw rotates. The purpose of the screw is to convey the composition or the gelled composition formed downstream, to gel and to homogenize the material via shearing forces (friction) and to build up the pressure necessary for forcing the gelled composition through the narrow die gap. The composition is preferably introduced on to the screw via a hopper in the intake region, and in the subsequent course of the conveying through the extruder is gelled and mixed.

In process step iii), the gelled composition is then forced through an annular die. The molten tube formed is inflated with air, and in process step iv) is cooled by cooling air from the outside and optionally from the inside. The width and thickness of the blown film are also specified here.

Before the blown film obtained in this way is employed in process step v) for packaging a lipophilic packed product, it can optionally also be collapsed beforehand and then wound up.

In principle, the blown film can also comprise several layers which are laid on top of one another in the blown film die. According to the invention, however, it is preferable for at least that layer of a multilayered blown film which comes into direct contact with the lipophilic packed substance to be packaged to be produced from the composition described above.

The invention is now explained in more detail with the aid of non-limiting examples.

EXAMPLES

Examples 1 to 3

The following four plasticizer compositions are prepared by simple mixing:
Example 1 Edenol®1215 (polymer plasticizer based on a polyol ester from Emery Oleochemicals Europe, Düsseldorf)—not according to the invention
Example 2 500 g of Edeno®1215+200 g of triacetin—according to the invention
Example 3 Edeno®1234 (polymer plasticizer based on a polyol ester from Emery Oleochemicals Europe, Düsseldorf)—not according to the invention
Example 4 500 g of Edenol®1234+200 g of triacetin—according to the invention The viscosity of the four plasticizer compositions is determined by the Brookfield method at 20° C.

TABLE 1

| Example | Viscosity [mPas] |
| --- | --- |
| 1 | 1,288 |
| 2 | 432 |
| 3 | 11,080 |
| 4 | 2,360 |

Examples 5 to 8

PVC pastes are prepared by means of the plasticizer compositions from Examples 1 to 4 with a dissolver from Werner Mathis AG (amount of material 200 g). The dispersing was carried out at room temperature (approx. 20° C.) and in vacuo (approx. 100 mbar). The compositions are described in the following (Examples 5 to 8):

Example 5: 100 parts by weight of PVC Solvin 271 PC, 3 parts by weight of Edenol D 81[1], 3 parts by weight of Stabiol VCZ 2001/1[2] and 70 parts by weight of the plasticizer composition from Example 1—not according to the invention;

[1] Epoxy plasticizer from Cognis, Düsseldorf
[2] Ca—Zn stabilizer from Cognis, Düsseldorf Example 6: 100 parts by weight of PVC Solvin 271 PC, 3 parts by weight of Edenol D 81, 3 parts by weight of Stabiol VCZ 2001/1 and 70 parts by weight of the plasticizer composition from Example 2—according to the invention;

Example 7: 100 parts by weight of PVC Solvin 271 PC, 3 parts by weight of Edenol D 81, 3 parts by weight of Stabiol VCZ 2001/1 and 70 parts by weight of the plasticizer composition from Example 3—not according to the invention;

Example 8: 100 parts by weight of PVC Solvin 271 PC, 3 parts by weight of Edenol D 81, 3 parts by weight of Stabiol VCZ 2001/1 and 70 parts by weight of the plasticizer composition from Example 4—according to the invention;

The PVC pastes were gelled in a Mathis Thermotester (Werner Mathis AG) to give sheeted-out compounds (180° C., 3 minutes). The changes in weight of the sheeted-out compounds obtained in this way after storage in i-octane were determined for determination of the migration properties of the plasticizer. For this, the test specimens (3×10 cm) were stored in 200 ml of i-octane at 60° C. for 4 hours. Thereafter, the test specimens were dried first for 12 hours at room temperature and thereafter for 24 hours at 60° C. and the difference in weight was determined. The following values were determined:

TABLE 2

|  | Example 5 | Example 6 | Example 7 | Example 8 |
| --- | --- | --- | --- | --- |
| Weight of the test specimen beforehand [g] | 2.863 | 2.590 | 2.538 | 2.706 |
| Weight of the test specimen after storage in i-octane [g] | 2.737 | 2.471 | 2.431 | 2.594 |
| Weight decrease [g] | 0.126 | 0.119 | 0.107 | 0.112 |
| Weight decrease [%] | 4.4 | 4.6 | 4.2 | 4.1 |

The measurement results show that by means of the polyol esters of short-chain monocarboxylic acids (triacetin), it was possible significantly to reduce the viscosities of the polymer plasticizers Edenol®1215 and Edenol®1234 (see Table 1), while the migration properties into the lipophilic solvent i-octane did not deteriorate (see Table 2). The plasticizer combination according to the invention of polymeric plasticizer and polyol ester of short-chain monocarboxylic acids (triacetin) is therefore suitable in particular as a plasticizer for PVC pastes which are employed for the production of polymer layers, in packaging containers intended for lipophilic packed substances, which face the container interior and may come into contact with the lipophilic packed substance. Due to the low viscosity of the compositions, these can be applied in a particularly simple manner, for example by brushing, as a homogeneous layer which is characterized by a constant density, or they can be employed particularly advantageously in injection moulding processes for the production of containers. These compositions can also be employed particularly advantageously for the production of blown films due to their low viscosity. Due to the advantageous migration properties with respect to lipophilic substances, only little plasticizer can migrate out of the containers or the inner layers of the container into the packed product.

The invention claimed is:

1. A packaging comprising a container surrounding a container interior, wherein at least the inner surface of the container in contact with the container interior is produced from a composition which comprises
   a thermoplastic polymer, and
   a plasticizer composition comprising
      a polymeric plasticizer and
      a polyol ester,
and wherein the container is at least partly filled with a lipophilic packed product.

2. The packaging according to claim 1, wherein the container is multilayered laminate, the innermost layer of which facing the container interior is produced from the composition defined in claim 1.

3. The packaging according to claim 2, wherein the packaging is obtainable by a process comprising the process steps
   a) provision of a laminate precursor;
   b) application of a composition to at least one of the two surfaces of the laminate precursor, the composition being obtainable by mixing the thermoplastic polymer in particulate form and the plasticizer composition;
   c) heating of the composite applied to at least one of the two surfaces of the laminate precursor to a temperature which is sufficient to gel the composition;
   d) cooling of the gelled composition;
   e) formation of a container from the laminate obtained in this way, the layer applied in process step b) facing the container interior;
   f) filling of the container with the lipophilic packed substance; and
   g) closing of the filled container.

4. The packaging according to claim 1, wherein the container is produced from the composition defined in claim 1 to the extent of at least 50 wt. %, based on the total weight of the container.

5. The packaging according to claim 4, wherein the packaging is obtainable by a process comprising the process steps
   A) introduction of a composition which is obtainable by mixing the thermoplastic polymer in particulate form and the plasticizer composition into an injection mould which forms the container;
   B) heating of the composition in the injection mould to a temperature which is sufficient to gel the composition;
   C) cooling of the gelled composition;
   D) removal of the container from the injection mould;
   E) filling of the container with the lipophilic packed substance; and
   F) closing of the filled container.

6. The packaging according to claim 4, comprising the process steps:
   i) introduction of a composition which is obtainable by mixing the thermoplastic polymer in particulate form and the plasticizer composition and optionally at least one of the further additives described above into a blown film installation;

ii) heating of the composition in the blown film installation to a temperature which is sufficient to gel the composition;
iii) extrusion of the gelled composition through an annular die and inflation of the tube formed from the gelled composition by means of air;
iv) cooling of the tube to obtain a blown film; and
v) packaging of the lipophilic packed product with the blown film.

7. The packaging according to claim 1, wherein the thermoplastic polymer is polyvinyl chloride (PVC).

8. The packaging according to claim 1, wherein the polyol ester is an ester of a $C_1$-$C_{10}$-monocarboxylic acid and a triol or tetraol.

9. The packaging according to claim 1, wherein the polyol ester is glycerol triacetate.

10. The packaging according to claim 1, wherein the polymeric plasticizer is a polyester of a dicarboxylic acid and at least one diol.

11. The packaging according to claim 10, wherein the polymeric plasticizer is an ester of a carboxylic acid chosen from the group consisting of formic acid, acetic acid, propionic acid, butyric acid and a mixture of at least two of these and a polyfunctional alcohol chosen from the group consisting of ethylene glycol, propylene glycol, trimethylolpropane, glycerol, diglycerol, polyglycerol, pentaerythritol, sorbitol, dipentaerythritol and a mixture of at least two of these.

12. The packaging according to claim 1, wherein the composition from which the inner surface of the container in contact with the container interior is produced comprising
   I) 40 to 90 wt. %, based on the total weight of the composition, of the thermoplastic polymer,
   II) 10 to 60 wt. %, based on the total weight of the composition, of the plasticizer composition, and
   III) 0 to 25 wt. %, based on the total weight of the composition, of at least one additive which differs from components I) and II),
   wherein the amount of components I), II) and III) adds up to 100 wt. %.

13. The packaging according to claim 1, wherein the lipophilic packed product is a fat-containing foodstuff, an oil, a hydrocarbon or hydrocarbon mixture.

* * * * *

UNITED STATES PATENT AND TRADEMARK OFFICE
CERTIFICATE OF CORRECTION

Page 1 of 1

PATENT NO.      : 8,741,404 B2
APPLICATION NO. : 13/577144
DATED           : June 3, 2014
INVENTOR(S)     : Peter Daute et al.

It is certified that error appears in the above-identified patent and that said Letters Patent is hereby corrected as shown below:

On the Title Page, change item "(76)", to read: -- (75) --.

On the Title Page, insert item -- (73) Emery Oleochemicals GmbH, Duesseldorf, (DE) --.

Signed and Sealed this
Twelfth Day of August, 2014

Michelle K. Lee
*Deputy Director of the United States Patent and Trademark Office*